Figure 1:
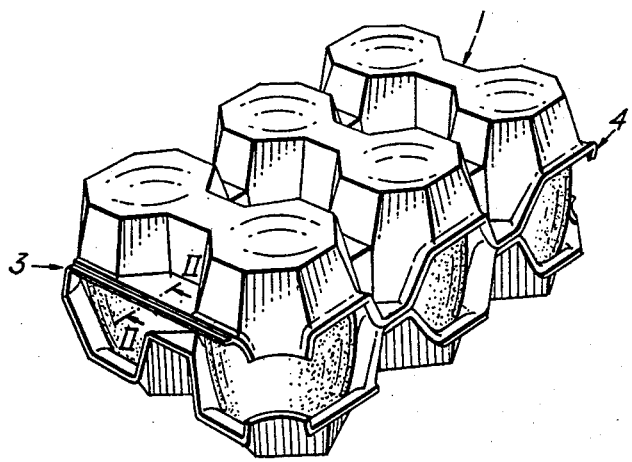

April 2, 1963  R. W. E. MOSSE ETAL  3,083,511
PACKING MACHINES

Filed June 21, 1961  6 Sheets-Sheet 1

Inventors
RICHARD W. E. MOSSE
HAROLD COOKSON
PETER C. VIRGO

By *Imirie & Smiley*
Attorneys

RICHARD W. E. MOSSE
HAROLD COOKSON
PETER C. VIRGO

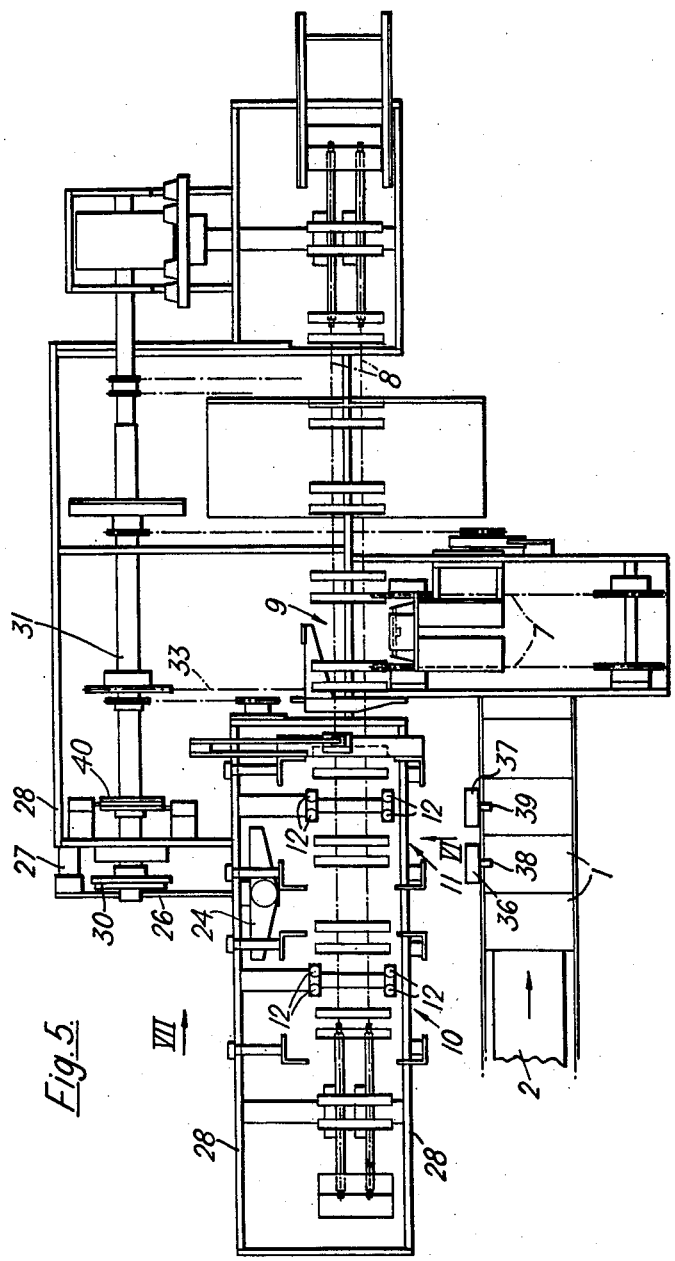

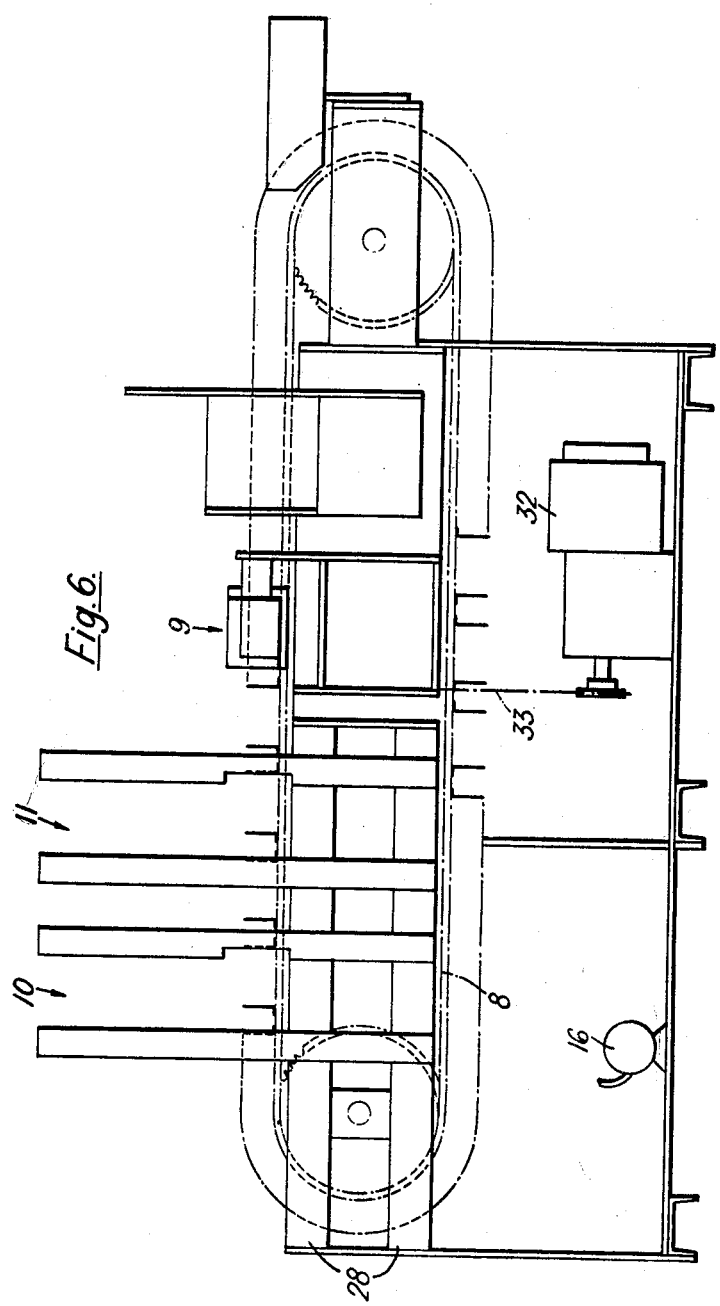
RICHARD W. E. MOSSE
HAROLD COOKSON
PETER C. VIRGO

Inventors
RICHARD W. E. MOSSE
HAROLD COOKSON
PETER C. VIRGO

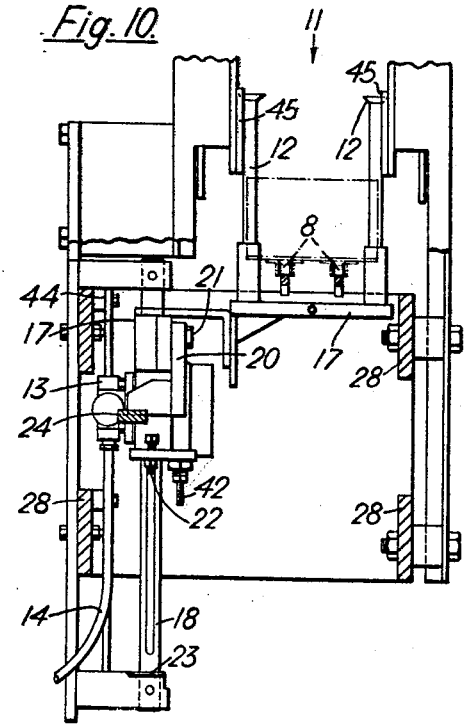
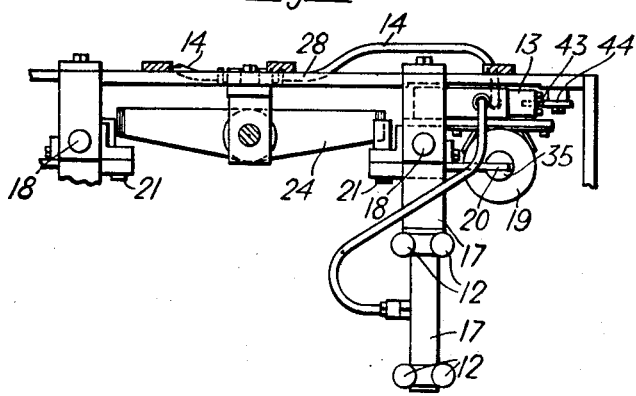
RICHARD W. E. MOSSE
HAROLD COOKSON
PETER C. VIRGO

United States Patent Office 3,083,511
Patented Apr. 2, 1963

3,083,511
PACKING MACHINES
Richard Wolfgang Emil Mosse, London, Harold Cookson, Portsmouth, and Peter Charles Virgo, Waterlooville, England, assignors to The Metal Box Company Limited, London, England, a British company
Filed June 21, 1961, Ser. No. 118,708
Claims priority, application Great Britain July 1, 1960
8 Claims. (Cl. 53—64)

This invention relates to packing machines and in particular to a machine for packing a moulded tray containing eggs or other fragile or easily damaged articles such as fruit in an outer wrapper.

Products such as eggs or fruit which are packed in moulded trays are usually graded and each tray bears some means by which the grade of the product contained in the tray may be distinguished. The products are usually packed in the trays as the products are delivered from the grading machine and when the trays, which are of uniform size irrespective of the grade of the articles, are to be enclosed in an outer wrapper, the wrappers for the different grades are distinguished one from another, for example by being of different colours, so that the grade of product contained in the packages can be readily distinguished one from another.

The packed trays may be delivered to the packing machine in haphazard order as regards grade and it is a main object of the present invention to provide the wrapping machine with wrapper feeding apparatus the operation of which is controllable by the trays being delivered to the wrapping machine so that the machine can operate continuously irrespective of the order in which the graded trays are delivered thereto.

According to the invention there is provided apparatus for feeding wrappers to a machine for disposing wrappers about moulded trays each of like size and containing articles of a predetermined grade, comprising a conveyor movable intermittently in one direction, at least two wrapper-containing magazines spaced apart along the path of the conveyor, transfer means operable selectively to remove wrappers from the magazines and to position the wrappers on the conveyor for movement thereby to a tray receiving position, tray-feeding means arranged to move trays provided with grade-distinguishing means in succession to the conveyor, and sensing means connected with the transfer means and operable by the grade-distinguishing means of trays moved by the tray-feeding means to determine from which magazine a wrapper is transferred by the transfer means to the conveyor.

Figure 2:
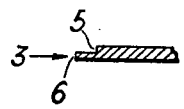
Figure 3:
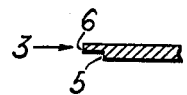

In order that the invention may be clearly understood one embodiment thereof will now be described, by way of example, with reference to the accompanying drawings, in which:

FIG. 1 pictorially illustrates one form of tray which may be used with apparatus according to the invention, FIG. 2 is a section on line II—II, FIG. 1, FIG. 3 is a section similar to that of FIG. 2 but illustrating an alternative form of tray.

Figure 4:
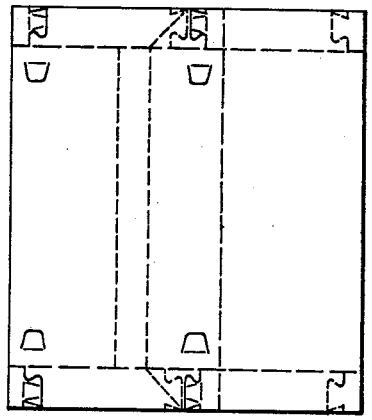
Figure 7:
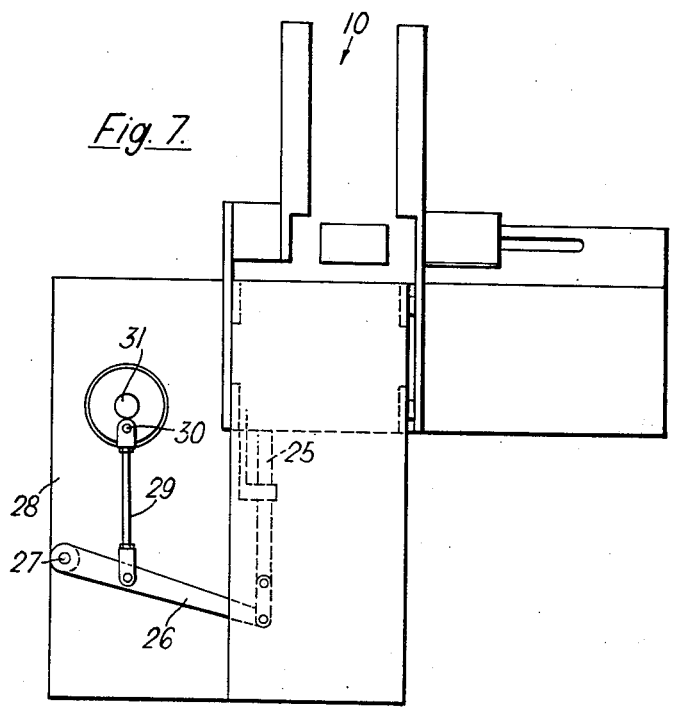
Figure 8:
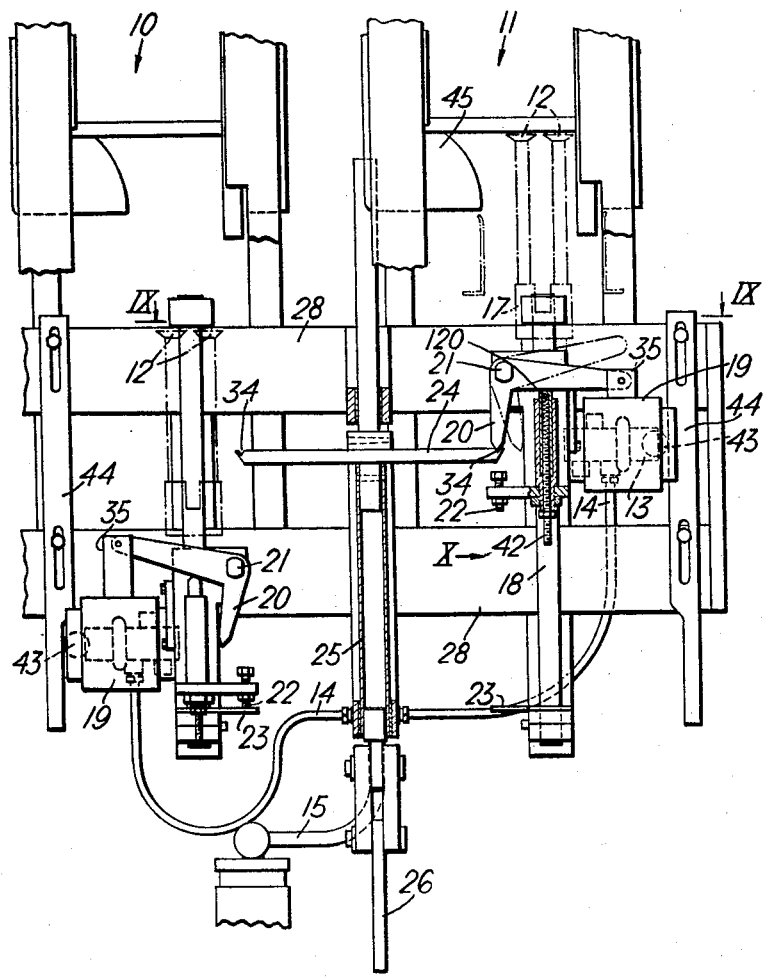

FIG. 4 illustrates a wrapper in the collapsed condition thereof, in which it is contained in a magazine for removal therefrom by apparatus according to the invention, FIG. 5 is a diagrammatic plan of a machine fitted with apparatus according to the invention, FIG. 6 is a diagrammatic elevation looking in the direction of arrow VI, FIG. 5, FIG. 7 is an elevation looking in the direction of arrow VII, FIG. 5, FIG. 8 is an elevation, partly in section, of apparatus for feeding containers from a pair of magazines, FIG. 9 is a section of a part of the apparatus on line IX—IX, FIG. 8, and FIG. 10 is a view looking in the direction of arrow X, FIG. 8.

The wrapping machine to which the invention is applied will be described in detail only in so far as is necessary to the understanding of the invention.

The outer wrappers in which the packed or loaded trays 1, FIG. 1, are to be disposed may comprise sleeves, FIG. 3, into which the trays are inserted and the wrappers are distinguished, as by colouring, one from another according to the grade of the product packed in the trays to be inserted into the sleeves.

In the following description it will be assumed that the product packed in the trays 1 is eggs and that the machine is to cater for two grades of egg such as "large" and "standard" which will be packed in trays appropriate thereto, the different trays being delivered in haphazard order as regards grade to the machine by tray-feeding means comprising an endless belt conveyor 2, FIG. 5. The trays, FIG. 1, are of substantially oblong rectangular shape and each is provided with grade-distinguishing means which may be sensed automatically to control the feeding of wrappers to the machine. The grade-distinguishing means may comprise different colours but preferably comprises a side 3 of the tray which is contoured to indicate the grade of the eggs packed therein, the contour including two substantially vertical portions 5, 6 of the side, or of each of two opposite sides 3, 4, which are located one above the other with one of the portions 5, 6 nearer than the other to the centre of the tray.

The tray-feeding means 2 delivers the trays into the path of a delivery mechanism comprising endless chains 7, FIG. 5, and pushers, not shown, which are carried by the chains 7 and which move the trays in succession to a conveyor 8 movable intermittently in one direction, delivery of the trays to the conveyor being effected at a position 9 succeeding that at which wrappers are delivered to the conveyor.

The wrappers in the collapsed condition thereof, FIG. 4, are contained in two magazines, 10, 11, one for each kind of wrapper according to grade, which are spaced apart along the path of the conveyor so that from each magazine a wrapper can be transferred to and set-up on the conveyor during an interval when the conveyor is stationary. Transfer means are operable selectively to determine from which of the magazines a wrapper is removed and set-up on the conveyor for movement thereby to the position 9 at which a tray is inserted into the set-up wrapper.

The transfer means comprises for each magazine four suckers 12, FIGS. 8 to 10, connected through a valve 13, and flexible tubes 14, 15 with an air pump 16, FIG. 6. The suckers 12 are supported by a sucker 17 slidable axially of a stationary guide shown as a pillar 18 and the valve 13 is also carried by the carrier 17 together with a solenoid 19 and a connecting member 20, formed as a bell-crank pivoted at 21 to the carrier 17. In the lowermost position thereof the carrier 17 is arrested by engagement of an adjustable stop 22 with a fixed projection 23, FIG. 8. Movement of the carrier 17 in an upward direction away from the fixed stop or projection 23 is effected by an operating member in the form of a plate 24 secured to the upper end of an operating rod 25 supported for vertical reciprocation and reciprocated by an arm 26 pivoted at 27, FIG. 7, to one of the frames 28 by which the apparatus is supported, and a crank arm 29 connected to a crank 30 rotatable with a main shaft 31 from which the apparatus is operated, the shaft 31 being driven by motor 32 and chain 33, FIG. 6.

The operating member 24, which is the movable part common to the two magazines 10, 11, is provided with notches 34, FIG. 8, in which is engaged the V-shaped end of one arm of one of the bell-cranks 20, according to which set of suckers is operative. The other arm of the bell-crank is connected to the armature 35 of the solenoid 19 and when the solenoid is de-energised the bell-crank is spring-urged, by spring 120, to the chain-dotted position, FIG. 8, thereof so that the bell-crank is disengaged from the operating member 24. Thus the solenoid is energised when the carrier 17 is to be movable away from the said fixed projection 23 to effect delivery of a wrapper from the magazine.

The solenoids 19 are electrically connected one to each of a pair of sensing devices shown as microswitches, 36, 37, FIG. 5, having plungers 38, 39 which project into the path of the trays 1 being moved towards the conveyor 8 by the tray-feeding means. The microswitches are spaced apart lengthwise of the path of the trays and are arranged at different levels in a vertical plane with respect to the surface of the belt 2 on which the trays rest so that one of the plungers 38, 39 will be engaged and depressed by an upper contoured tray side portion 6 which is remote frome the centre of the tray, and the other plunger will be engaged and depressed by a lower contoured tray side portion 6 which is remote from the centre of the tray. Neither of the plungers will be depressed except by a tray contour appropriate thereto. When a microswitch is operated by a tray the electrical circuit to the appropriate solenoid 19 is energised but a timing switch 40, FIG. 5, operated by the main shaft 31 of the machine ensures that this occurs only when the operating member 24 is at about the fully retracted or lowermost position thereof. The extent of rocking movement of the bell-crank 20 can be adjusted by a stop 41 and screw 42.

When a bell-crank 29 is conditioned for engagement by a notch 34 of the operating member 24 the carrier 17 is raised by the operating member and shortly after the initial upward movement of the carrier a roller 43 which controls valve 13 is engaged with the high portion of a fixed cam 44 so that suction is applied to the suckers 12. The suckers 12 are moved by the carrier into engagement with the lowermost wrapper in the magazine and are adhered thereto and as the operating member 24 moves downward the carrier follows it by gravity and draws the wrapper out of the magazine towards the conveyor. As the wrapper is drawn out of the magazine it is moved over fixed guides 45, FIGS. 8 and 10, so that as the wrapper is moved on to the conveyor it is set-up and assumes a rectangular cross-section ready for the insertion of a tray 1 thereinto.

As the carrier approaches the fixed stop 23 the roller 43 moves on to the low part of cam 44 so that the suction is cut off from the suckers 12 as the bottom of the wrapper engages the conveyor 8. The operating member 24, however, continues to move in a downward direction until it is disengaged from the bell-crank 20 thus permitting resetting of the bell-crank, if necessary, so that it will not be engaged by the member 24 on the next upward movement thereof.

In the foregoing description the tray 1 has been assumed to have a contoured side for co-operation with a sensing device which includes a feeler but it will be understood that, if desired, the tray may be provided with a grade-indicating device, such as coloured matter, which can be sensed photo-electrically and in such instance the solenoids 19 are controlled by a photo-electric sensing device.

We claim:

1. Apparatus for feeding wrappers to a machine for disposing wrappers about moulded trays each of like size and containing articles of a predetermined grade, comprising a conveyor movable intermittently in one direction, at least two wrapper-containing magazines spaced apart along the path of the conveyor, transfer means operable selectively to remove wrappers from the magazines and to position the wrappers on the conveyor for movement thereby to a tray receiving position, tray-feeding means arranged to move trays provided with grade-distinguishing means in succession to the conveyor, and sensing means connected with the transfer means and operable by the grade-distinguishing means of trays moved by the tray-feeding means to determine from which magazine a wrapper is transferred by the transfer means to the conveyor.

2. Apparatus for feeding wrappers to a machine for disposing wrappers about moulded trays each of like size and containing articles of a predetermined grade, comprising a conveyor movable intermittently in one direction, at least two wrapper-containing magazines spaced apart along the path of the conveyor, sucker mechanism for each magazine, a carrier for each sucker mechanism, said carriers being independently supported for reciprocation to effect the transfer of a wrapper to the conveyor from the magazine appropriate to the sucker mechanism, a reciprocable operating member to effect reciprocation of the sucker mechanisms, a coupling carried by each sucker mechanism and operable to couple the sucker mechanism to the operating member for reciprocation thereby, tray-feeding means arranged to move trays provided with grade-distinguishing means in succession to the conveyor, and sensing means connected with said couplings and operable by the grade-distinguishing means of trays moved by the tray-feeding means to determine which carrier is coupled to the operating member to effect the transfer of a wrapper from a magazine to the conveyor.

3. Apparatus for feeding wrappers to a machine for disposing wrappers about moulded trays each of like size and containing articles of a predetermined grade, comprising a conveyor movable intermittently in one direction, at least two wrapper-containing magazines spaced apart along the path of the conveyor, sucker mechanism for each magazine, a carrier for each sucker mechanism, said carriers being independently supported for reciprocation to effect the transfer of a wrapper to the conveyor from the magazine appropriate to the sucker mechanism, a reciprocable operating member to effect reciprocation of the sucker mechanisms, a bell-crank lever pivoted to each carrier for engagement by the operating member, a spring connected to each said lever to urge the lever to a position at which it cannot be engaged by the operating member, tray-feeding means arranged to move trays provided with grade-distinguishing means in succession to the conveyor, and sensing means connected with said levers and operable by the grade-distinguishing means of trays moved by the tray-feeding means to determine which lever is moved into the path of the operating member to effect the transfer of a wrapper from a magazine to the conveyor.

4. Apparatus for feeding wrappers to a machine for disposing wrappers about moulded trays each of like size and containing articles of a predetermined grade, comprising a conveyor movable intermittently in one direction, at least two wrapper-containing magazines spaced apart along the path of the conveyor, sucker mechanism for each magazine, a carrier for each sucker mechanism, said carriers being independently supported for reciprocation to effect the transfer of a wrapper to the conveyor from the magazine appropriate to the sucker mechanism, a reciprocable operating member to effect reciprocation of the sucker mechanisms, a bell-crank lever pivoted to each carrier for engagement by the operating member, a spring connected to each said lever to urge the lever to a position at which it cannot be engaged by the operating member, a solenoid movable with each carrier and connected with the bell-crank lever pivoted thereto to effect rocking of the lever into the path of the operating member, tray-feeding means arranged to move trays provided with grade-distinguishing means in succession to the conveyor, and sensing means connected with said solenoids and operable by the grade-distinguishing means of trays moved by the tray-feeding means to determine which lever is moved into the path of the operating member to effect the transfer of a wrapper from a magazine to the conveyor.

5. Apparatus for feeding wrappers to a machine for disposing wrappers about moulded trays each of like size and containing articles of a predetermined grade, comprising a conveyor movable intermittently in one direction, at least two wrapper-containing magazines spaced apart along the path of the conveyor, transfer means operable selectively to remove wrappers from the magazines and to position the wrappers on the conveyor for movement thereby to a tray receiving position, tray-feeding means arranged to move trays having grade-indicating contours formed on sides thereof in succession to the conveyor, and a microswitch for each magazine, said microswitches being spaced apart lengthwise of the path of trays moved by the tray-feeding means and arranged at different levels for actuation by the grade-indicating contours of the trays, said switches being connected with the transfer means to determine from which magazine a wrapper is transferred by the transfer means to the conveyor.

6. Apparatus for feeding wrappers to a machine for disposing wrappers about moulded trays each of like size and containing articles of a predetermined grade, comprising a conveyor movable intermittently in one direction, at least two wrapper-containing magazines spaced apart along the path of the conveyor, sucker mechanism for each magazine, a carrier for each sucker mechanism, said carriers being independently supported for reciprocation to effect the transfer of a wrapper to the conveyor from the magazine appropriate to the sucker mechanism, a reciprocable operating member to effect reciprocation of the sucker mechanisms, a coupling carried by each sucker mechanism and operable to couple the sucker mechanism to the operating member for reciprocation thereby, tray-feeding means arranged to move trays having grade-indicating contours formed on sides thereof in succession to the conveyor, and a microswitch for each magazine, said microswitches being spaced apart lengthwise of the path of trays moved by the tray-feeding means and arranged at different levels for actuation by the grade-indicating contours of the trays, said switches being connected with said couplings to determine which of the carriers is coupled to the operating member to effect the transfer of a wrapper from a magazine to the conveyor.

7. Apparatus for feeding wrappers to a machine for disposing wrappers about moulded trays each of like size and containing articles of a predetermined grade, comprising a conveyor movable intermittently in one direction, at least two wrapper-containing magazines spaced apart along the path of the conveyor, sucker mechanism for each magazine, a carrier for each sucker mechanism, said carriers being independently supported for reciprocation to effect the transfer of a wrapper to the conveyor from the magazine appropriate to the sucker mechanism, a reciprocable operating member to effect reciprocation of the sucker mechanisms, a bell-crank lever pivoted to each carrier for engagement by the operating member, a spring connected to each said lever to urge the lever to a position at which it cannot be engaged by the operating member, tray-feeding means arranged to move trays having grade-indicating contours formed on sides thereof in succession to the conveyor, and a microswitch for each magazine, said microswitches being spaced apart lengthwise of the path of trays moved by the tray-feeding means and arranged at different levels for actuation by the grade-indicating contours of the trays, said switches being connected with said bell-crank levers to determine which lever is moved into the path of the operating member to effect the transfer of a wrapper from a magazine to the conveyor.

8. Apparatus for feeding wrappers to a machine for disposing wrappers about moulded trays each of like size and containing articles of a predetermined grade, comprising a conveyor movable intermittently in one direction, at least two wrapper-containing magazines spaced apart along the path of the conveyor, sucker mechanism for each magazine, a carrier for each sucker mechanism, said carriers being independently supported for reciprocation to effect the transfer of a wrapper to the conveyor from the magazine appropriate to the sucker mechanism, a reciprocable operating member to effect reciprocation of the sucker mechanisms, a bell-crank lever pivoted to each carrier for engagement by the operating member, a spring connected to each said lever to urge the lever to a position at which it cannot be engaged by the operating member, a solenoid movable with each carrier and connected with the bell-crank lever pivoted thereto to effect rocking of the lever into the path of the operating member, tray-feeding means arranged to move trays having grade-indicating contours formed on sides thereof in succession to the conveyor, and a microswitch for each magazine, said microswitches being spaced apart lengthwise of the path of trays moved by the tray-feeding means and arranged at different levels for actuation by the grade-indicating contours of the trays, said switches being connected with the solenoids to determine which lever is moved into the path of the operating member to effect the transfer of a wrapper from a magazine to the conveyor.

No references cited.